US009056387B2

(12) United States Patent
Vindler et al.

(10) Patent No.: US 9,056,387 B2
(45) Date of Patent: Jun. 16, 2015

(54) MEDIA BLASTING CARRIAGE FOR A STATOR SLOT

(71) Applicants: Michael R. Vindler, Pittsburgh, PA (US); Scott A. Karstetter, Monroeville, PA (US); Jordan D. Haase, Irwin, PA (US)

(72) Inventors: Michael R. Vindler, Pittsburgh, PA (US); Scott A. Karstetter, Monroeville, PA (US); Jordan D. Haase, Irwin, PA (US)

(73) Assignee: Siemens Energy, Inc., Orlando, FL (US)

( * ) Notice: Subject to any disclaimer, the term of this patent is extended or adjusted under 35 U.S.C. 154(b) by 218 days.

(21) Appl. No.: 13/738,032

(22) Filed: Jan. 10, 2013

(65) Prior Publication Data

US 2013/0196575 A1 Aug. 1, 2013

Related U.S. Application Data

(60) Provisional application No. 61/592,097, filed on Jan. 30, 2012.

(51) Int. Cl.

| | |
|---|---|
| ***B24C 3/32*** | (2006.01) |
| ***B24C 1/00*** | (2006.01) |
| ***B24C 11/00*** | (2006.01) |
| ***B24C 1/08*** | (2006.01) |
| ***H02K 15/00*** | (2006.01) |
| ***B24C 3/06*** | (2006.01) |
| ***B23Q 1/56*** | (2006.01) |
| ***H02K 15/02*** | (2006.01) |
| *H02K 1/16* | (2006.01) |

(52) U.S. Cl.
CPC . *B24C 3/322* (2013.01); *B24C 1/00* (2013.01); *B24C 11/00* (2013.01); *B24C 1/086* (2013.01); *B24C 3/325* (2013.01); *H02K 1/16* (2013.01); *H02K 15/0006* (2013.01); *B24C 3/065* (2013.01); *B23Q 1/56* (2013.01); *H02K 15/024* (2013.01)

(58) Field of Classification Search
CPC ............ B24C 3/32; B24C 3/322; B24C 3/325
USPC ............ 451/38, 39, 439, 440, 418, 76, 78, 87
See application file for complete search history.

(56) References Cited

U.S. PATENT DOCUMENTS

| | | | | |
|---|---|---|---|---|
| 3,719,009 | A * | 3/1973 | Thompson | 451/38 |
| 5,161,291 | A * | 11/1992 | Guenther | 29/56.5 |
| 5,233,744 | A * | 8/1993 | Noland | 29/566.1 |
| 5,957,761 | A * | 9/1999 | Miller et al. | 451/92 |
| 7,845,040 | B2 * | 12/2010 | Meier et al. | 15/104.16 |

FOREIGN PATENT DOCUMENTS

| | | | |
|---|---|---|---|
| DE | 19619202 | A1 | 5/1996 |
| EP | 0568315 | A1 | 11/1993 |
| JP | 08107657 | A | 4/1996 |
| JP | 09107662 | A | 4/1997 |
| JP | 2002233115 | A | 8/2002 |

* cited by examiner

*Primary Examiner* — Robert Rose

(57) ABSTRACT

A device for removing a coating formed in a slot of a stator core. The device includes a carriage movably attached to a first guide rail assembly to enable movement of the carriage in a longitudinal direction. The device also includes a first drive screw wherein rotation of the first drive screw moves the first guide rail assembly in the longitudinal direction. In addition, the device includes a second guide rail assembly that is attached to the carriage wherein the second guide rail assembly enables movement of the carriage in a direction transverse to the longitudinal direction. Further, the device includes a second drive screw wherein rotation of the second drive screw moves the carriage in the transverse direction. The carriage includes a nozzle that moves within the slot in either or both the longitudinal or transverse directions wherein the nozzle sprays an abrasive media for removal of the coating.

20 Claims, 7 Drawing Sheets

MEDIA BLASTING CARRIAGE FOR A STATOR SLOT

CROSS-REFERENCE TO RELATED APPLICATIONS

This application claims the benefit under 35 U.S.C. §119 (e) of U.S. Provisional Application No. 61/592,097 entitled AUTOMATED STATOR SLOT MEDIA BLASTING CARRIAGE, filed on Jan. 30, 2012 which is incorporated herein by reference in its entirety and to which this application claims the benefit of priority. In addition, the disclosure of copending patent application entitled LASER CLEANING SYSTEM FOR A STATOR SLOT, first named inventor Michael R. Vindler, is hereby incorporated by reference.

BACKGROUND OF THE INVENTION

1. Field of the Invention

This invention relates to electric generators, and more particularly, to a device that utilizes a rail system and a carriage to provide a moveable nozzle for spraying blasting media to remove a coating formed in a slot of a stator core 2. Description of the Prior Art Thus, a need exists in the art for an electric generator used for electric power generation including a rotor and a stator having a stator core. The stator core is fabricated from thin laminations and includes a plurality of stator slots each adapted to receive an associated electrical winding formed as a coil. Each coil is retained within its corresponding slot by a wedge device for providing a tight fit so that movement of the coil relative to the stator core is minimized. A global vacuum pressure impregnation (GVPI) process is then used to impregnate the entire stator with an epoxy based resin coating. Such coatings serve to bond the coils to the stator to further minimize relative movement of the coils while also providing electrical insulation, corrosion resistance and other benefits.

A significant number of electric generators currently in use have been manufactured using the GVPI process and have been in operation for several years. However, it has been found that the coating breaks down and erodes over time thus requiring that the stator be repaired. An option for repairing the stator is to perform a field rewind of the stator at a customer location. During a field rewind, the wedges and stator coils are removed but a significant portion of the original coating remains. Prior to the installation of replacement coils and wedges, the remaining coating must be removed from the stator slots in order to obtain proper coil fitment and electrical contact between the new coils and the stator core. The remaining coating is approximately 0.020 inches thick and is comprised of layers of resin and mica insulation and is difficult to remove from the slots.

A method used to remove coating from the stator slots is to manually remove the coating using hand held brass scrapers. However, this process is inefficient, labor intensive, and may damage the stator core iron if performed incorrectly.

Another method utilizes high pressure water to remove the coating from the slots. However, it has been found that high pressure water undesirably penetrates between the core laminations and results in the removal of insulation between the laminations. This causes undesirable electrical shorts between individual laminations. Further, the water oxidizes the iron in the stator core and causes rust on the laminations.

SUMMARY OF THE INVENTION

Accordingly, an object of the invention is a device for removing a coating located in a slot of a stator core of an electric generator. The device includes a first guide rail assembly removably attached to the stator core and a carriage movably attached to the first guide rail assembly to enable movement of the carriage in a longitudinal direction relative to the stator core. The device also includes a first drive screw wherein rotation of the first drive screw moves the first guide rail assembly in the longitudinal direction. In addition, the device includes a second guide rail assembly that is moveably attached to the carriage, wherein the second guide rail assembly enables movement of the carriage in a direction transverse to the longitudinal direction. Further, the device includes a second drive screw wherein rotation of the second drive screw moves the carriage in the transverse direction. A nozzle is attached to the carriage wherein the nozzle moves within the slot in either the longitudinal or transverse directions or both the longitudinal and transverse directions wherein the nozzle sprays an abrasive media for removal of the coating.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
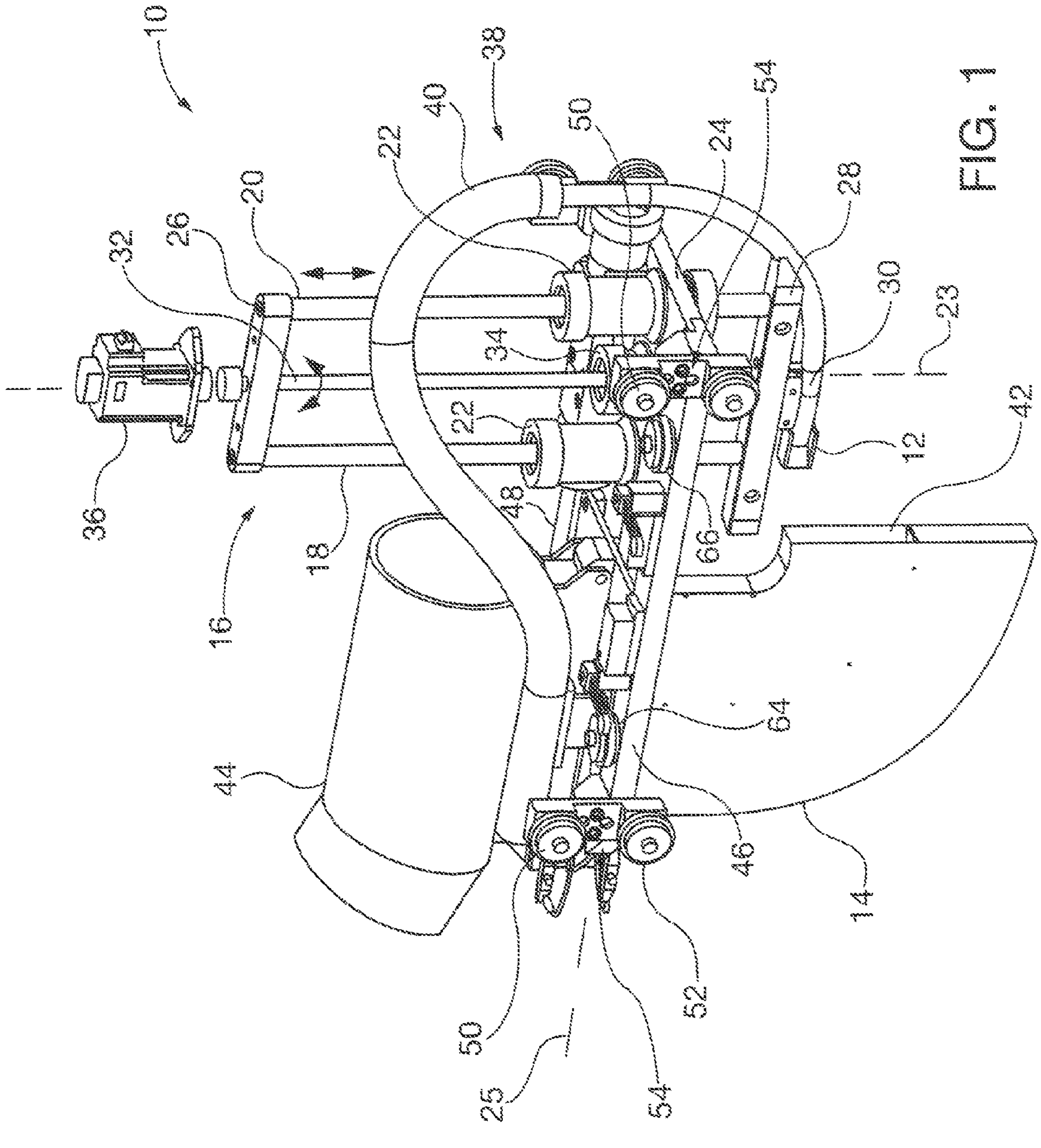
FIG. 1 is a perspective view of a carriage assembly for a media blasting device in accordance with the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-7C.

After considering the following description, those skilled in the art will clearly realize that the teachings of the present invention can be readily utilized.

During a field rewind, the wedges and stator coils are removed but a significant portion of the original coating remains. Prior to the installation of replacement coils and wedges, the remaining coating must be removed from the stator slots in order to obtain proper coil fitment and electrical contact between the new coils and the stator core. The remaining coating is approximately 0.020 inches thick and is comprised of layers of resin and mica insulation and is difficult to remove from the slots.

Figure 2:
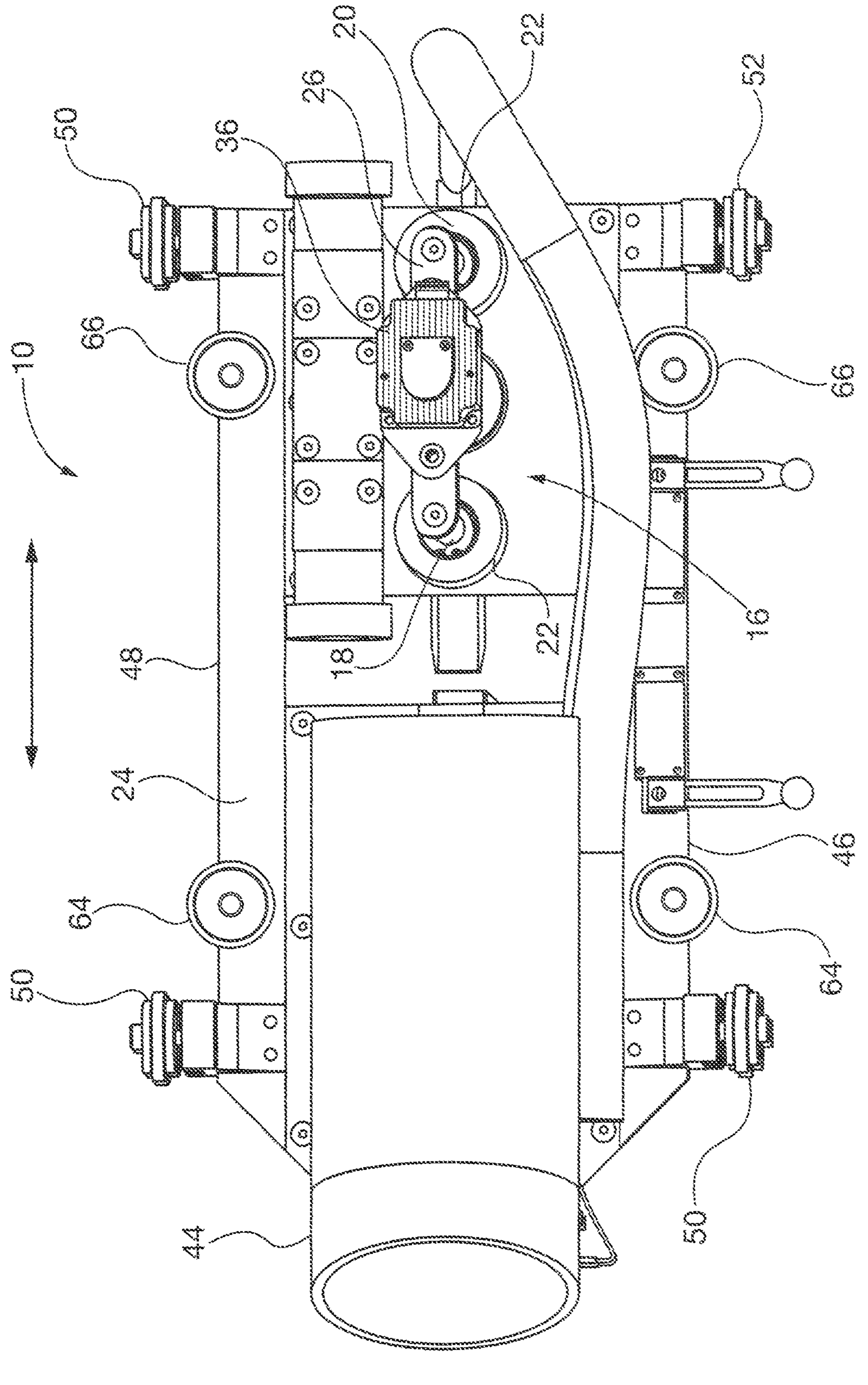
FIG. 2 is a top view of the carriage assembly.

Referring to FIGS. 1 and 2, perspective and top views, respectively, are shown of a carriage assembly 10 for a media blasting device 56 used to remove coating in slots 88 of a stator core 58 (see FIG. 3) of an electric generator. The carriage assembly 10 includes a spraying device such as a nozzle 12 for spraying blasting media to remove the coating located in the stator slots 88. In addition, the carriage assembly 10 includes a dust collection manifold 14 for removing dust generated due to the sprayed blasting media and coating, which has been removed. The carriage assembly 10 further includes a first rail assembly 16 having left 18 and right 20 first guide rails that extend through corresponding guides 22 located on a carriage 24. The left 18 and right 20 first guide rails are oriented along an axis 23 transverse to a longitudinal axis 25 of the media blasting device 56 (see FIG. 3). The longitudinal axis 25 corresponds to a longitudinal axis of the stator core 58. The guides 22 enable transverse movement of the left 18 and right 22 first rails relative to the carriage 24 along the transverse axis 23. The left 18 and right 22 first rails are positioned between a top cross member 26 and a bottom cross member 28 having a bracket 30 for holding the nozzle 12.

A first drive screw 32 is located between the left 18 and right 22 first rails and is threadably engaged with a first bearing block 34 located on the carriage 24. Rotation of the first drive screw 32 causes movement of the first rail assembly 16 and thus the nozzle 12 relative to the carriage 24 along the transverse axis 23. In particular, rotation of the first drive screw 32 in a first direction causes either upward or downward movement, for example, of the nozzle 12 along the transverse axis 23 whereas rotation of the first drive screw 32 in a second direction causes movement of the nozzle 12 in an opposite direction along the transverse axis 23. The first drive screw 32 is connected to a first electric motor 36 mounted on the top cross member 26 which rotates the first drive screw 32 in either the first or second directions. The first electric motor 36 may be a stepper motor and includes an encoder used for determining a transverse position, for example a vertical position along the transverse axis 23, of the nozzle 12 relative to a slot 88. The nozzle 12 is connected to a supply conduit 38 having a supply hose section 40 that is flexible to accommodate movement of the nozzle 12.

The dust collection manifold 14 includes a vacuum inlet 42 located adjacent the nozzle 12 and is positioned such that a substantial portion of the dust created by the blasting media is collected by the dust collection manifold 14. In addition, the shape of the dust collection manifold 14 corresponds with the stator slot profile so as to minimize the amount of blast media that bypasses the dust collection manifold 14. The dust collection manifold 14 extends through the carriage 24 and is connected to an exhaust conduit 44.

Left 46 and right 48 longitudinal sides of the carriage 24 each include top guide wheels 50 each spaced apart from an associated bottom guide wheel 52 to form a gap 54 for receiving an associated second guide rail as will be described.

Figure 3:
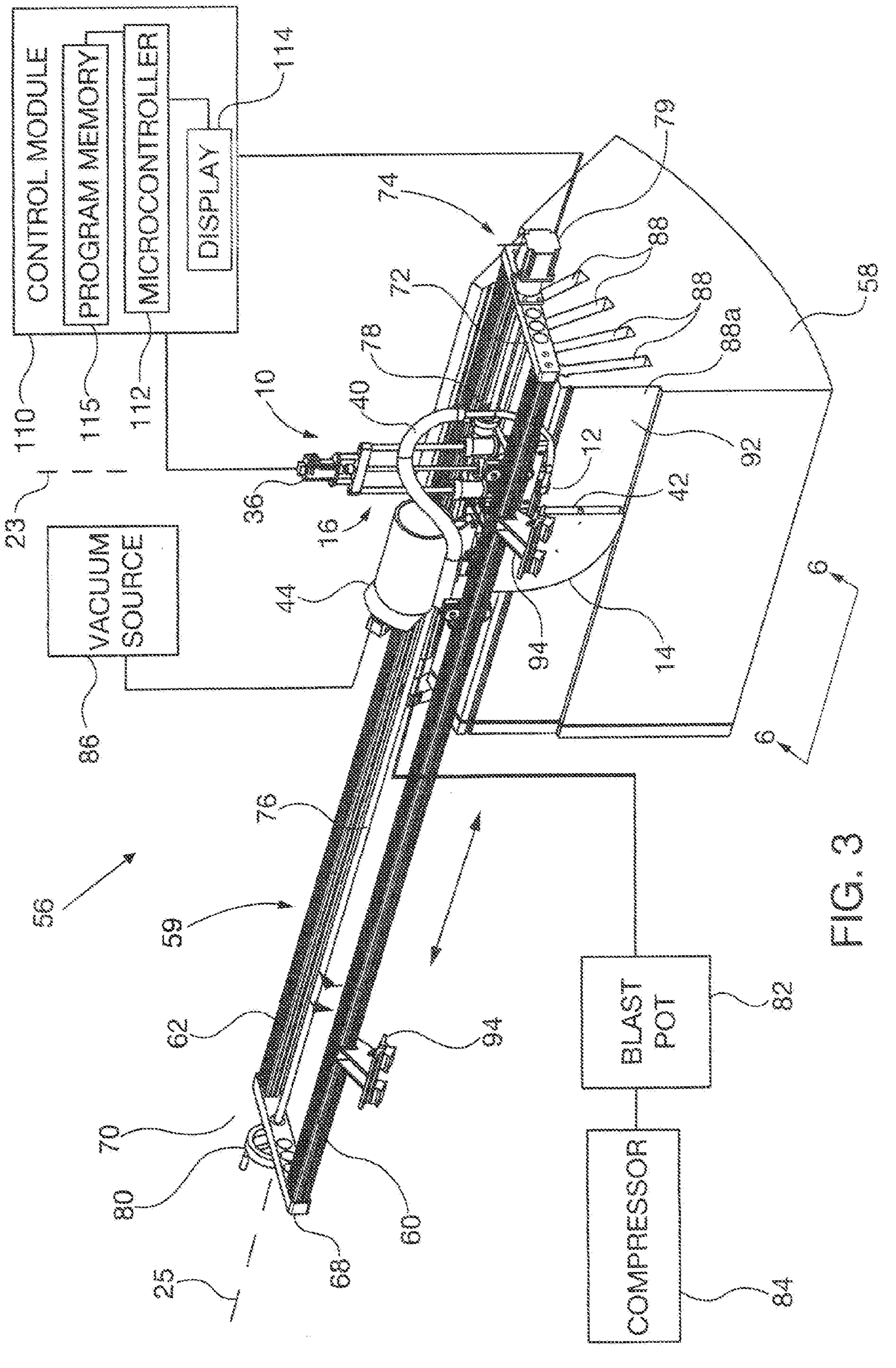
FIG. 3 is a perspective view of the media blasting device including a carriage assembly.
Figure 4:
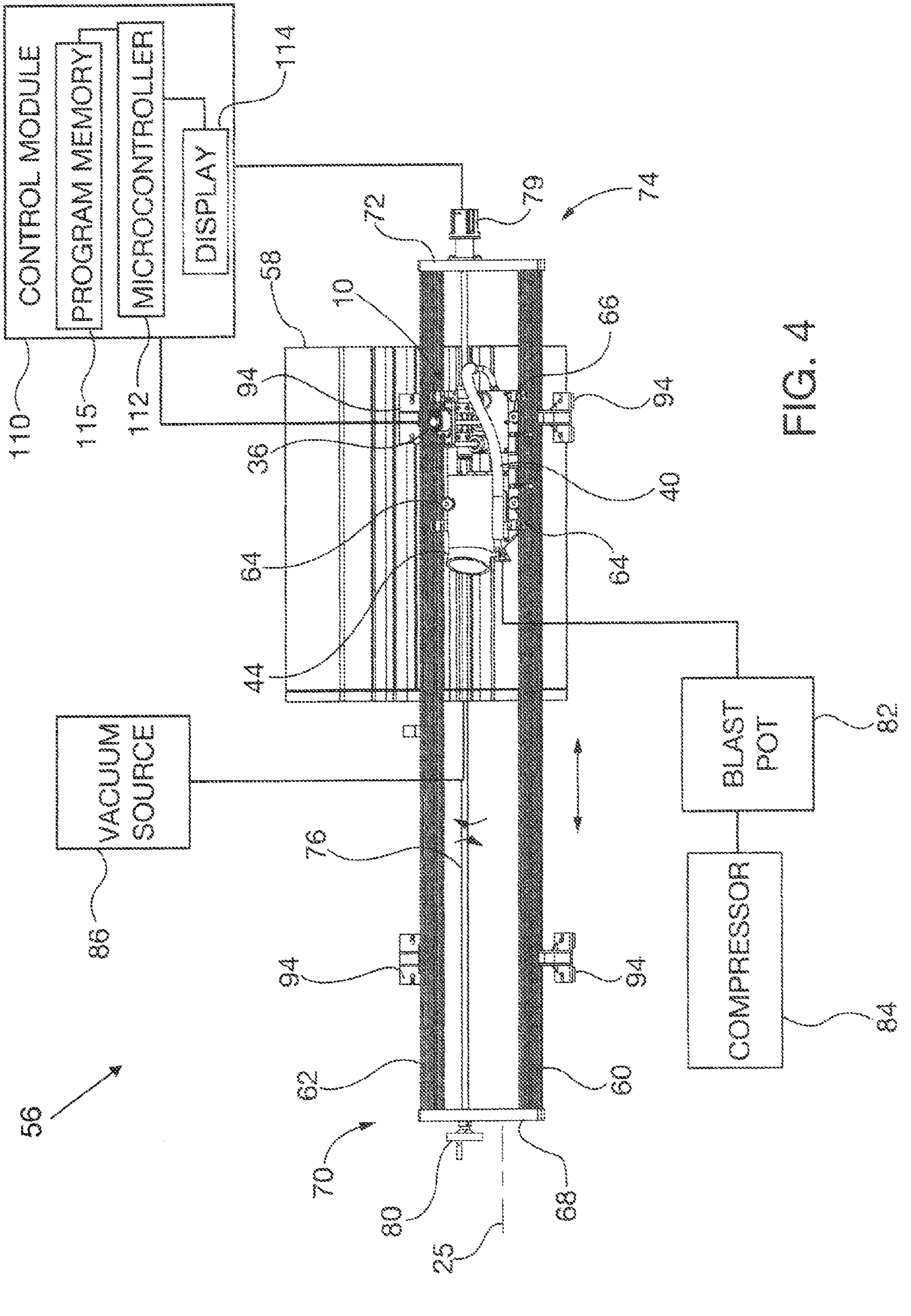
FIG. 4 is a top view of the media blasting device and carriage assembly.

Referring to FIGS. 3 and 4, perspective and top views, respectively, of the media blasting device 56 positioned on a stator core 58 (depicted as a partial view) are shown. The device 56 further includes a second rail assembly 59, which is sized to enable the removal of coating from a section of the stator core 58. The second rail assembly 59 includes left 60 and right 62 second guide rails, which are oriented along the longitudinal axis 25 of the media blasting device 56. The longitudinal axis 25 corresponds to a longitudinal axis of the stator core 58. The left 60 and right 62 second rails are inserted between the gaps 54 formed by the top 50 and bottom 52 guide wheels to enable movement of the carriage assembly 10 along the longitudinal axis 25 relative to the stator core 58. The carriage 24 also includes front 64 and rear 66 guide wheels, which contact an inner portion of left 60 and right 62 second rails to assist in alignment of the carriage assembly 10 on the left 60 and right 62 second rails. The left 60 and right 62 second rails are positioned between a front cross member 68 and rear cross member 72 located at front 70 and rear 74 ends, respectively, of the left 60 and right 62 second rails.

A second drive screw 76 is located between the left 60 and right 62 second rails and is threadably engaged with a second bearing block 78 located on the carriage 24. Rotation of the second drive screw 76 causes movement of the carriage assembly 10 and thus nozzle 12 along the longitudinal axis 25 relative to the stator core 58. In particular, rotation of the second drive screw 76 in a first direction causes either forward or backward movement, for example, of the carriage assembly 10 and thus nozzle 12 along the longitudinal axis 25 whereas rotation of the second drive screw 76 in a second direction causes movement of the carriage assembly 10 and nozzle 12 in an opposite direction along the longitudinal axis 25. The second drive screw 76 is connected to a second electric motor 79, which may be a stepper motor, mounted on the rear cross member 72 which rotates the second drive screw 76 in either the first or second directions. The second electric motor 79 rotates the second drive screw 76 such that the carriage assembly 10 and thus nozzle 12 move relative to the stator core 58 at a precise and controllable rate. Typically, the carriage assembly 10 is controlled to move at approximately 2.5 feet per minute, depending on the characteristics of the coating and other factors. The device 56 also includes a hand wheel 80 for manually rotating the second drive screw 76.

The supply hose 40 is connected to a blast pot 82 pressurized by a compressor 84 to approximately 90 pounds per square inch (psi) that provides blasting media that is sprayed by the nozzle 12. In accordance with the present invention, a plastic abrasive media is used as the blasting media. The plastic blasting media may have a plastic urea 20/40 formulation such as that sold by Composition Materials Co. Inc., wherein 20/40 refers to a mesh size indicative of the minimum and maximum size particles, respectively, included in the media. The exhaust conduit 44 is connected to a vacuum source 86 having capacity of approximately 12,000 cubic feet per minute (cfm) to provide sufficient vacuum for collecting generated dust.

The device 56 is controlled by an operator via a control module 110 having a microcontroller 112 and program memory 115, which stores instructions for performing a cleaning procedure to remove coating from a slot 88. The module 110 includes controls for adjusting the speed of the carriage assembly 10 and for controlling the direction of movement of the carriage assembly 10 and thus nozzle 12 along the longitudinal axis 25. The module 110 also includes controls for adjusting the position of nozzle 12 along the transverse axis 23. In particular, the module 110 may include a control for moving the nozzle 12 along the transverse axis 23 in fixed increments or a control to enable minor adjustments to the transverse position. In addition, the module 110 includes a display 114 that provides readout indicative of a position of the nozzle 12 relative to a surface of a slot 88 being cleaned.

Figure 5A:
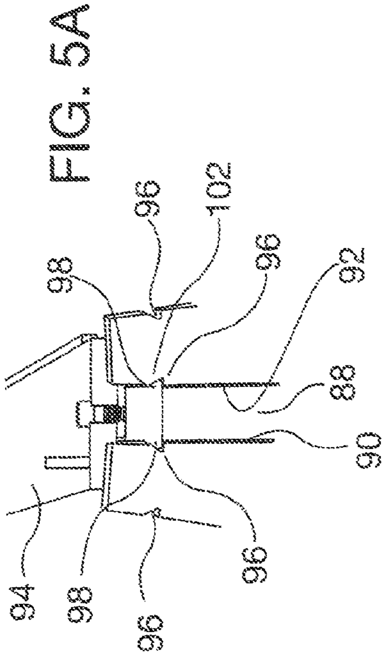
FIG. 5A is an enlarged view of balloon section 5A of FIG. 5 and depicts flanges of an attachment block inserted in grooves of a stator slot.
Figure 5:
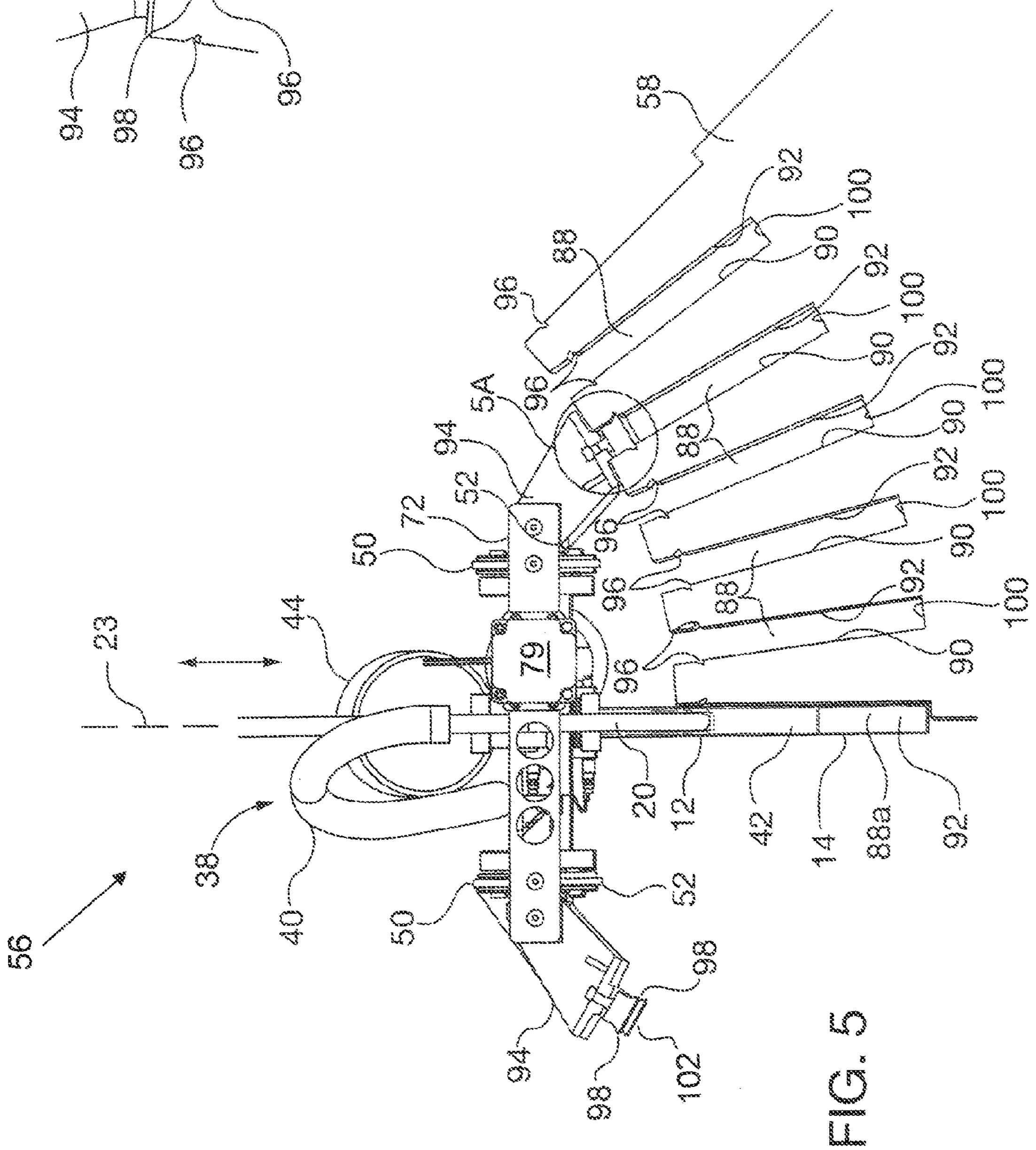
FIG. 5 is an end view of the media blasting device and a stator core shown as a partial view.

Referring to FIG. 5, an end view of the device 56 and stator core 58 (shown as a partial view) is depicted. The stator core 58 includes a plurality of slots 88 for receiving coils used to generate magnetic fields. Each slot 88 is defined by spaced apart left 90 and right 92 sidewalls and a bottom surface 100. Slot 88*a* is shown as a partial view and only depicts the right sidewall 92 and part of the bottom surface 100 for illustrative purposes. The left 60 and right 62 second rails include mounting feet 94, which are adapted to be removably attached to the stator core 58. Referring to FIG. 5A, an enlarged view of balloon section 5A of FIG. 5 is shown. The mounting feet 94 are attached to the stator core 58 using features substantially similar to that used to removably attach conventional wedges to the stator core 58. In one embodiment, the left 90 and right 92 sidewalls each include a groove 96 for accommodating corresponding flanges 98 that extend outwardly from an attachment block 102 located on each of the mounting feet 94. A fastener is then used to removably attach each of the mounting feet 94 to the stator core 58.

Figure 6:
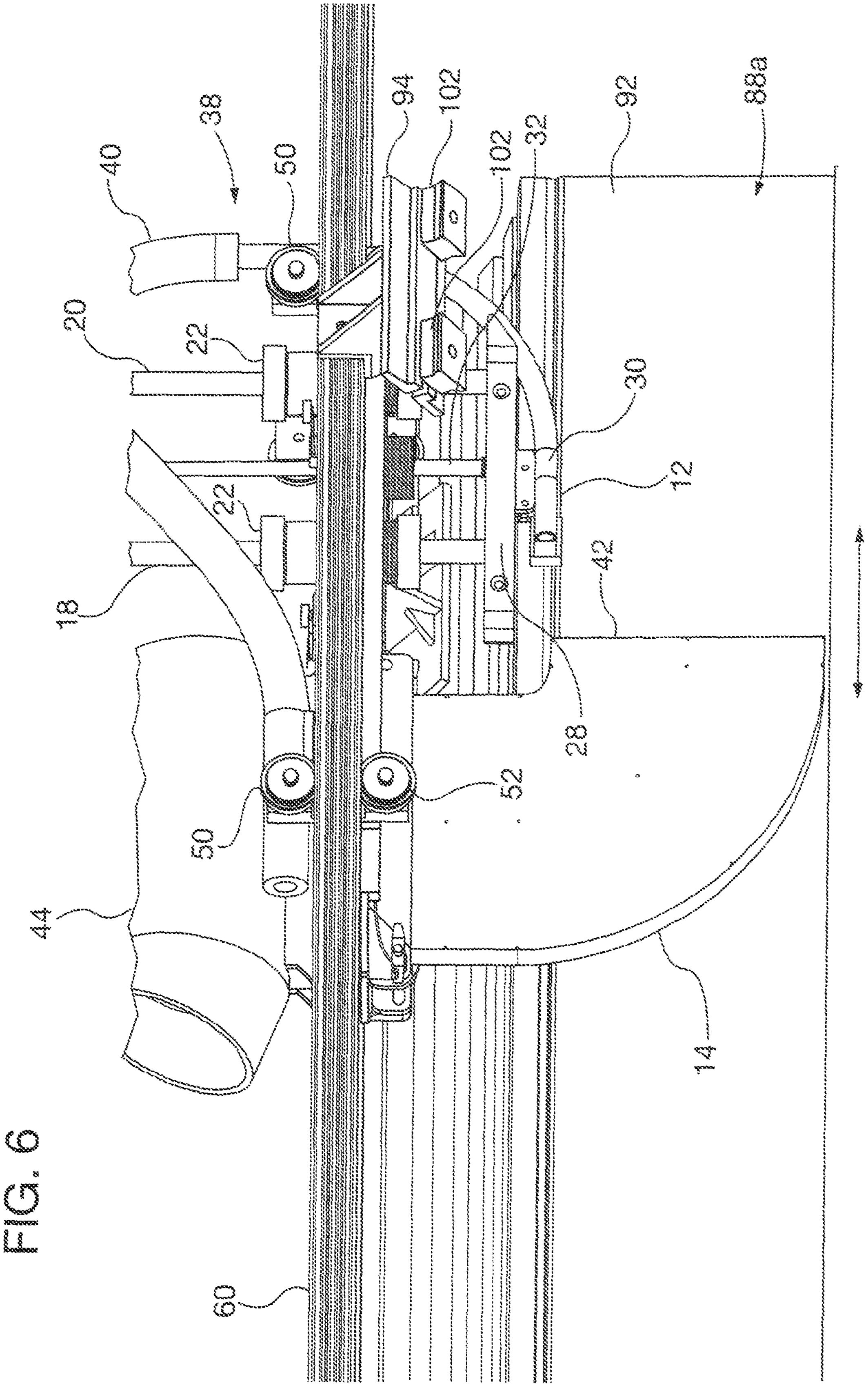
FIG. 6 is an enlarged view along view line 6-6 of FIG. 3 and depicts a dust collection manifold extending into a stator slot and adjacent to a nozzle outlet.

Referring to FIG. 6, an enlarged view along view line 6-6 of FIG. 3 is shown. In FIG. 6, the nozzle 12 is located within the partial slot 88*a* and adjacent the right sidewall 92. In addition, the dust collection manifold 14 extends down into the partial slot 88*a* adjacent to the nozzle outlet. The width of each slot 88 is relatively narrow and may be approximately 1.25 to 1.5 inches. The shape of the dust collection manifold 14 corresponds with the slot profile so as to minimize the amount of blast media that bypasses the dust collection manifold 14. The nozzle 12 is sized to fit the width of the slot 88 and is configured to provide a suitable angle relative to the slot surface for spraying the blasting media and to remove the coating.

Figure 7C:
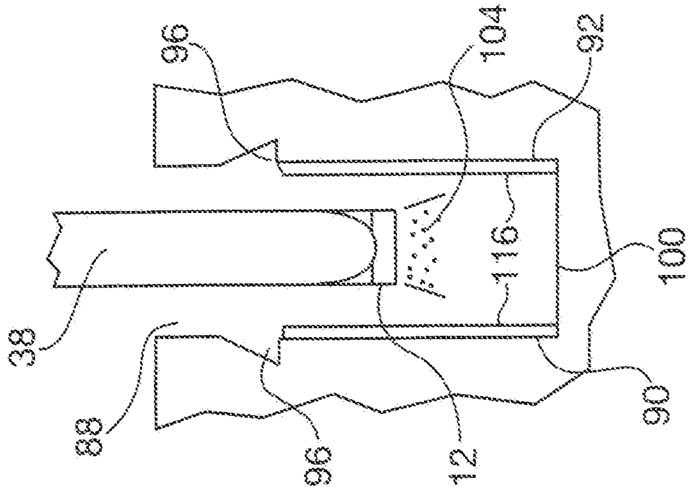
FIGS. 7A-7C depict end views of a nozzle and supply conduit in a stator slot and show alternate directions for a nozzle spray pattern.
Figure 7B:
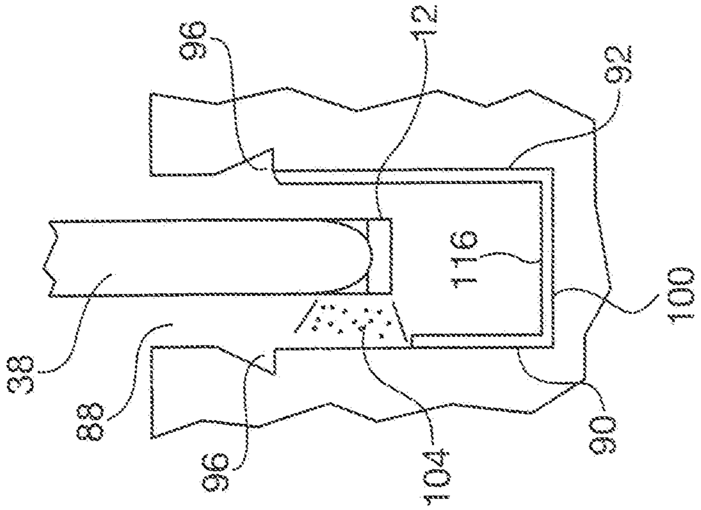
Figure 7A:
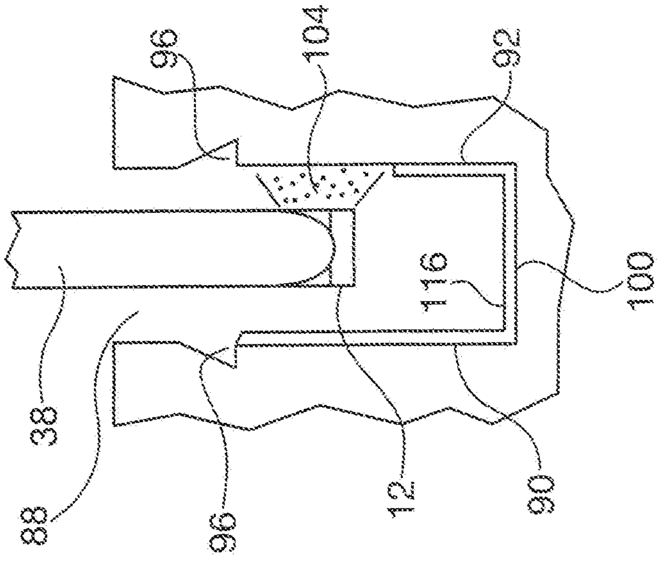

Alternate configurations of the nozzle 12 are used depending on the orientation of the slot surface to be cleaned. Referring to FIGS. 7A-7C, end views of a nozzle 12 and supply conduit 38 in a slot 88 are shown. FIGS. 7A-7C depict the direction of the nozzle spray patterns for spraying blasting media 104 used to remove a coating 116 located on portions of the left 90, right 92 sidewalls and bottom surface 100 of a slot 88 during a field rewind process. As previously described, the coating 116 is approximately 0.020 inches thick and is comprised of layers of resin and mica insulation, which is difficult to remove. In FIG. 7A, a first configuration for a nozzle 12 is shown wherein the blasting media 104 is sprayed toward the right side wall 92. In order to clean the left sidewall 90, the nozzle 12 having the first configuration is replaced with a second configuration for the nozzle 12 wherein the blasting media 104 is sprayed toward the left sidewall 90 as shown in FIG. 7B. In order to clean the bottom surface 100, the nozzle 12 having the second configuration is replaced with a nozzle 12 having a third configuration wherein the blasting media 104 is sprayed toward the bottom surface 100 as shown in FIG. 7C. Quick disconnect fittings may be used to facilitate replacement of the nozzles 12. In addition, the nozzle 12 generates a substantially fan shaped spray pattern to spray the blasting media.

Information regarding a transverse position of a nozzle 12 along the transverse axis 23 relative to a sidewall, for example, the right sidewall 92, is provided by the encoder in the first electric motor 36 to an operator. The transverse position of the nozzle 12 may then be adjusted by the operator as desired. During operation, the carriage assembly 10 is moved from, for example, the front end 70 of the second rails 60, 62 to the rear end 74 along the longitudinal axis 25 with the nozzle 12 located in a first transverse position as the nozzle 12 sprays the blasting media 104. This removes a strip of coating material along a longitudinal direction from the right sidewall 92. The transverse position of the nozzle 12 is then incrementally moved to a second transverse position. The carriage assembly 10 is then moved from the rear end 74 to the first end 72 to remove a second strip of coating material in a longitudinal direction. The process is repeated for the right sidewall 92 until a plurality of strips of coating material are removed and all of the coating has been removed from the right sidewall 92. The carriage assembly 10 is then repositioned to repeat the process for the left sidewall 92 and bottom surface 100 using corresponding nozzles. After the coating has been removed from a section of the stator core 58, the device 56 may then be removed from the stator core 58 and re-attached to another section of the stator core 58 to continue removal of the coating from the stator core 58. In addition, two devices 56 may be used simultaneously to clean slots in the stator core 58.

Operation of the device 56 may be automated by software to control movement of the nozzle 12 along the longitudinal and transverse axes while simultaneously spraying the blasting media 104. Use of the device 56 enhances worker safety since workers are removed from the area where the blasting media 104 is being sprayed.

In alternate embodiments, a single guide rail may be used instead of dual guide rails in a rail assembly. In addition, alternate drive mechanisms may be used to move the nozzle 12 such as drive mechanisms including pneumatic and/or hydraulic components, belt and pulley systems, gear systems and magnetic systems. Further, the current invention may also be used to remove coating from portions of the stator 58 other than a slot 88. In addition, the device 56 may be operated in alternate manner such that strips of coating material are first removed from a slot wall in a transverse direction and the nozzle 12 is then incremented in a longitudinal direction. Further, the laser cleaning system 56 may be operated such that strips of coating material are removed from a slot wall in longitudinal and transverse directions simultaneously. In other embodiments, the nozzle 12 may be moved in diagonal, rotating, spiral, raster and other motions relative to a slot 88 in order to remove the coating 116. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A device for removing a coating located in a slot of a stator core of an electric generator, wherein the slot includes first and second sidewalls and a bottom surface, comprising:

first and second nozzles that spray an abrasive media toward the first and second sidewalls to remove the coating from the first and second sidewalls, respectively;

a third nozzle that sprays the abrasive media toward the bottom surface to remove the coating from the bottom surface;

a first transport system for moving the nozzles in a first direction relative to the stator core;

a second transport system for moving the nozzles in a second direction relative to the stator core;

wherein at least one or both of the transport systems move the nozzles in at least one of the directions or both directions.

2. The device according to claim 1 further including a vacuum manifold located adjacent to the nozzles for vacuuming dust created by removal of the coating.

3. The device according to claim 1 wherein the first transport system includes first guide rails.

4. The device according to claim 1 wherein the first transport system includes a first electric motor and a first drive screw for moving the nozzles in the first direction.

5. The device according to claim 3 wherein the second transport system includes second guide rails.

6. The device according to claim 4 wherein the second transport system includes a second electric motor and a second drive screw for moving the nozzles in the second direction.

7. The device according to claim 1 wherein the abrasive media is a plastic abrasive media.

8. The device according to claim 1 wherein the nozzles move at a rate of approximately 2.5 feet per minute.

9. A device for removing a coating located in a slot of a stator core of an electric generator, wherein the slot includes first and second sidewalls and a bottom surface, comprising:

a first transport system for moving a carriage in a first direction relative to the stator core;

a second transport system mounted to the carriage, wherein the second transport system is moveable relative to the carriage in a second direction transverse to the first direction;

first and second nozzles that spray an abrasive media toward the first and second sidewalls to remove the coating from the first and second sidewalls, respectively; and a third nozzle that sprays the abrasive media toward the bottom surface to remove the coating from the bottom surface;

wherein each nozzle is attached to the second transport system and wherein each nozzle moves within the slot in either the first or second directions or both the first and second directions and wherein the nozzles spray an abrasive media for removal of the coating.

10. The device according to claim 9 further including a vacuum manifold located adjacent to the nozzles for vacuuming dust created by removal of the coating.

11. The device according to claim 9 wherein the first transport system includes a first pair of guide rails oriented in the first direction.

12. The device according to claim 9 wherein the first transport system includes a first electric motor and a first drive screw for moving the carriage in the first direction.

13. The device according to claim 11 wherein the second transport system includes a second pair of guide rails oriented in the second direction.

14. The device according to claim 12 wherein the second transport system includes a second electric motor and a second drive screw for moving the carriage in the second direction.

15. The device according to claim 9 wherein the abrasive media is a plastic abrasive media.

16. The device according to claim 9 wherein the first transport system includes mounting feet having flanges and the stator slot includes opposing walls each having a groove for accommodating the flanges to removably attach the device to the stator core.

17. The device according to claim 9 wherein the nozzles move at a rate of approximately 2.5 feet per minute.

18. A method for removing a coating located in a slot of a stator core of an electric generator, wherein the slot includes first and second sidewalls and a bottom surface, comprising the steps of:

providing a rail assembly on a carriage;

moving the carriage in a first direction relative to the stator core;

moving the rail assembly in a second direction relative to the stator core;

providing first and second nozzles on the rail assembly that spray an abrasive media toward the first and second sidewalls to remove the coating from the first and second sidewalls;

providing a third nozzle on the rail assembly that sprays the abrasive media toward the bottom surface to remove the coating from the bottom surface; and moving the nozzles in either the first or second directions or both the first and second directions.

19. The method according to claim 18 further including the step of vacuuming dust created by removal of the coating.

20. The method according to claim 18 wherein the abrasive media is a plastic abrasive media.

* * * * *